United States Patent [19]
Bradley

[11] 3,905,409
[45] Sept. 16, 1975

[54] COLLAPSIBLE SAW
[75] Inventor: Earl H. Bradley, Seekonk, Mass.
[73] Assignee: Worcester Pressed Aluminum Corporation, Worcester, Mass.
[22] Filed: Oct. 3, 1974
[21] Appl. No.: 511,540

Related U.S. Application Data
[63] Continuation-in-part of Ser. No. 471,232, May 20, 1974, abandoned.

[52] U.S. Cl. .............................. 145/33 E; 145/34 R
[51] Int. Cl. ............................................. B27b 21/00
[58] Field of Search .... 145/33 R, 33 A, 33 E, 34 R, 145/34 A

[56] References Cited
UNITED STATES PATENTS

| | | | |
|---|---|---|---|
| 2,595,288 | 5/1952 | Peters | 145/33 E |
| 3,149,652 | 9/1964 | Swenson | 145/34 R |
| 3,367,378 | 2/1968 | Ballard | 145/34 R |
| 3,724,519 | 4/1973 | McCord | 145/33 E |

FOREIGN PATENTS OR APPLICATIONS

| | | | |
|---|---|---|---|
| 201,764 | 2/1966 | Sweden | 145/33 E |
| 357,908 | 11/1905 | France | 145/33 E |

Primary Examiner—Al Lawrence Smith
Assistant Examiner—Marc R. Davidson
Attorney, Agent, or Firm—Barlow & Barlow

[57] ABSTRACT

A collapsible hand saw comprises a saw blade, a brace bar and a handle. The brace bar and the saw blade may house in a generally telescopic relation in the tubular handle which is of a size to receive and partly house the same. In working position these parts assemble in a generally triangular relationship so that the brace bar and handle are in generally right angle relation with the saw blade diagonally held therebetween so as to be conveniently manipulated by one hand holding the handle.

14 Claims, 8 Drawing Figures

COLLAPSIBLE SAW

CROSS REFERENCE TO RELATED APPLICATION

This application is a continuation-in-part of my earlier application Ser. No. 471,232, filed May 20, 1974, now abandoned.

BACKGROUND OF THE INVENTION

Hand saws of this general relation have been known in such patents as Wilson U.S. Pat. No. 2,781,806 and Swenson U.S. Pat. No. 3,149,652. In the former patent there is no housing of the parts in a convenient relationship, while in the latter patent the brace bar is slotted which so weakens it that the saw blade cannot be held in a sufficiently taut relation as the slotted housing bows or bends.

SUMMARY OF THE INVENTION

The saw blade of the present invention is housed under tension in a longitudinal recess of an I-beam type of brace bar which resists bowing and buckling when in working position. The brace bar and saw blade, when in collapsed position, enter and are housed by a tubular handle for a compact relationship, while the tubular handle acts as one of the right-angular members for supporting the saw blade between the brace bar and the handle so that the saw blade may be tensioned against the relatively rigid brace bar by extending diagonally across this right-angular relationship of the brace bar and handle.

DESCRIPTION OF THE PREFERRED EMBODIMENT

Figure 1:
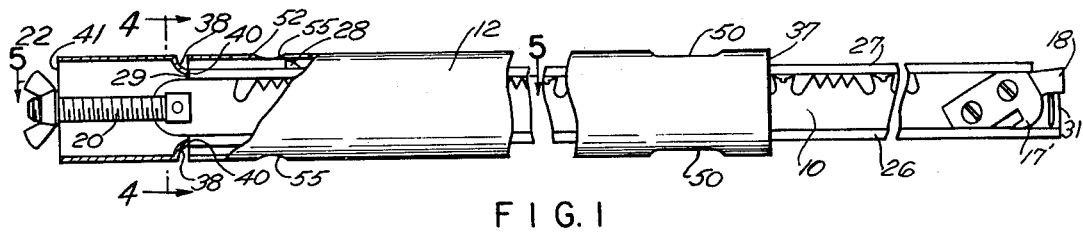
FIG. 1 is a side elevation of the saw in collapsed and housed position looking at one side thereof.

There are three distinct parts, 10 the saw blade, 11 the brace bar and 12 the handle, although in use, two of these parts are always connected together as will appear hereinafter, thus making it simple for assembling the saw from the collapsed to the working position.

The saw blade 10 has a brace-bar-engaging member generally designated 15 attached to one end thereof. This member is slotted as at 16 (see FIG. 6) so as to span the web portion of the brace bar with two hooks 17 and 17' on either side of the web of the brace bar to engage the flange thereof. Further, the member is provided with a dog means 18 so as to engage the resilient part of the web of the brace bar as will hereinafter appear. As will be apparent to those skilled in the art, the dog means may take several forms and is here illustrated as an inturned tab. At the other end of the saw blade 10 there is a stud 20 which has a hub 19 slotted to receive the saw blade 10 and be pivoted thereto by pin 21 for free pivoting of the stud about this pivot pin 21 which extends through the saw blade. A wing nut 22 is threaded onto the stud 20 for manipulation as will hereinafter appear.

Figure 6:
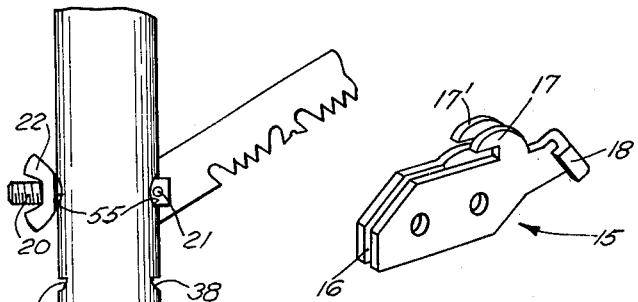
FIG. 6 is a perspective view of the hook which is fixed to the one end of the saw blade.
Figure 4:
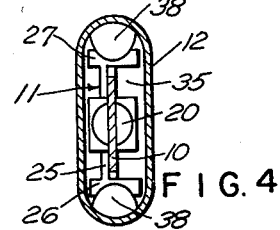
FIG. 4 is a sectional view on line 4—4 of FIG. 1.

The brace bar 11 is preferably of generally I-shaped construction having a web portion 25 with flanges 26 and 27 at either edge thereof which extend outwardly on both sides of the web as shown more clearly in FIG. 4. This brace bar is provided with an abutment 28 spaced somewhat from one end 29 thereof to engage the edge of the handle when inserted into an opening to receive it. The lower flange 27 of the brace bar 11 is cut away adjacent one of its ends as seen in FIG. 2 so that the claw-like hooks denoted 17 and 17' may receive the web portion 25 of the brace bar between them and engage either flange 27 as seen in FIG. 2. This brace bar is also slotted as at 30 to provide a resilient finger 31 to be engaged by the dog 18 of the member 15 as seen in FIGS. 1 and 6.

Figure 5:
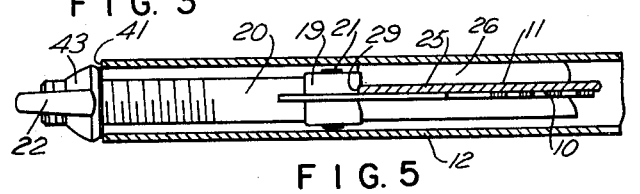
FIG. 5 is a sectional view on substantially line 5—5 of FIG. 1.

The saw blade 10 is of a width to be received between the flanges 26 and 27 of brace bar 11, which form with web 25 a recess 35, and the blade together with the member 15 is of a thickness less than the extent of the flanges so that the brace bar 11 may be received within the handle 12. When within this recess the dog means 18 will engage the resilient arm 31 as seen in FIG. 1 while the hub 19 of the stud 20 will engage the opposite end 29 of the web portion 25 of the brace bar 11 (see FIG. 5) requiring that the resilient arm 31 be flexed somewhat so that this hub may engage this portion 29, thus holding the saw blade under tension in the recess 35 and in assembled relation with the brace bar. It will be noted that the hub 19 is slightly recessed centrally thereof to insure that it will not be deflected laterally out of engagement with the portion 29 of web 25.

Figure 2:
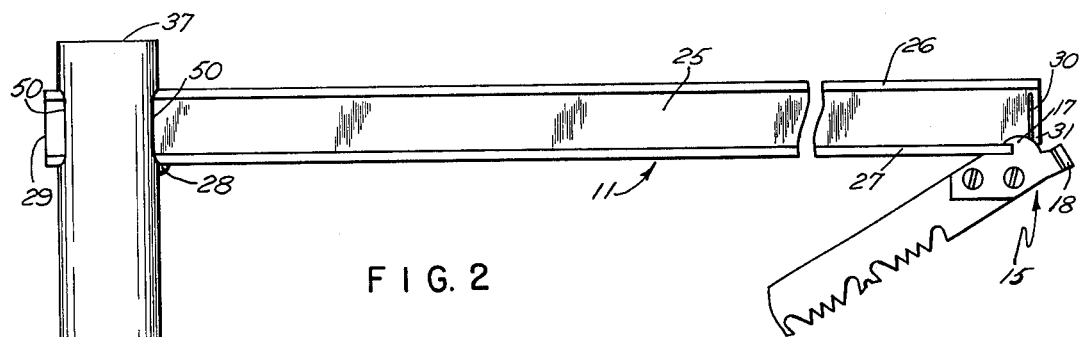
FIG. 2 is an elevation looking at the other side of the handle and with the brace bar and saw blade in working position.

The handle 12 is of a flattened tubular formation (see FIG. 4) having its interior dimension such as to receive the brace bar and saw blade, when in housed position as shown in FIG. 1, by sliding this assembly inwardly from one end, such as 37, of this tubular handle member. The stock of this tubular member is pressed inwardly at its upper and lower edges as at 38 so as to provide stops or abutments 40 to engage the end 29 of the brace bar assembled with the saw blade and limit the amount that it can be inserted into the tubular handle from the end 37. When this abutment is engaged by the brace bar, the stud 20 of the saw blade will protrude beyond the end of the tubular handle as at 41 as seen more clearly in FIG. 5 and the hub portion 43 of the wing nut 22 will be of such a size as to engage the opposite sides of the tubular handle so that when this wing nut is tightened the brace bar and saw blade will be drawn into the tubular handle and against the abutments 40 and be firmly held therein.

The tubular handle is further provided with diametrically opposite openings 50 of a size and shape so as to snugly receive the brace bar in a position extending generally at right angles to the longitudinal extent of the handle and when the brace bar is in this position the abutment 28 will engage the marginal edge of opening 50 of the handle so as to limit the extent that the brace bar may be positioned through these openings 50 in the handle.

The handle is also provided with diametrically opposite openings 55 to receive the stud 20 when the saw blade is in working position. Slots 56 extend from either side of the openings 55 so that the saw blade may enter these slots.

Assuming that the saw blade and brace bar are in the collapsed or housed position shown in FIG. 1, to assemble the saw into working position as shown in FIG. 2, the wing nut 22 is first detached. The brace bar and saw which is assembled therewith is then slid out of the handle 12 and the stud 20 is positioned in the openings 55 to receive it, and the wing nut is loosely assembled on the stud 20. The brace bar is then detached from the saw blade and positioned in the diametrically opposite openings 50 in the handle to receive it and then with the brace bar having its abutment 28 snugly against the handle as seen in FIG. 2 and with the wing nut 22 still loose on the stud, the bifurcated hooks 17, 17' are positioned on either side of the web 25 of the brace bar and with these hooks 17, 17' hooked on either side of the flange 27 of the wing nut is then tightly secured to put the desired tension on the saw blade in the position substantially as shown in FIG. 2.

Figure 8:
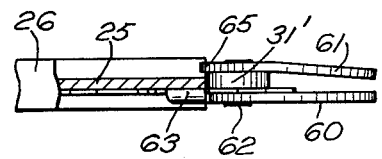
FIG. 8 is a top view thereof.
Figure 7:
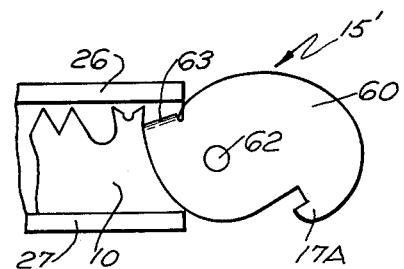
FIG. 7 is a partial elevational view of a modified form of end member for the blade with the blade shown in the stored position.
Figure 3:
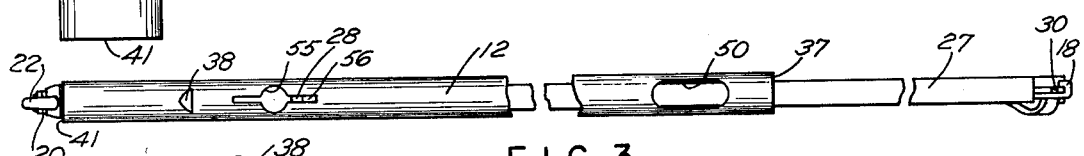
FIG. 3 is an edge view of the saw in the housed position shown in FIG. 1 and looking from the top of FIG. 1.

Referring now to FIGS. 7 and 8 there is shown a second embodiment of the invention in which the brace-bar-engaging member 15' is formed in a slightly different fashion than the similar member 15 previously described. In this case the member 15' is formed by a pair of spaced plates 60 and 61 which are spaced by a bushing (not shown) within a resilient member 31' and held together by a pin 62 that passes through the bushing. The plate 60 is securely fastened to the end of the saw blade 10 by means of a connecting portion 63 that locks between adjacent teeth, while the pin 62 passes directly through the saw blade. Both plates 60 and 61 are provided with hooks 17A that have an identical function to the hooks 17, 17' of the previous embodiment and are adapted to be positioned on either side of the web 25 of the brace bar and engage the flange 27 when assembled. As will be seen by particularly referring to FIG. 8, the arrangement is such in this particular embodiment that in the nested position of the saw blade 10, a resilient member 31' is drawn up against the web 25 and portions of the plates 60 and 61 extend on either side of this web. In the same fashion as in the previous embodiment the hub 19 of the stud 20 engages the opposite end of the web portion 25 and now the resilient means which formerly was the slotted portion 31 has been replaced by the resilient spacer 31'. Additionally in this embodiment a simpler assembly is had and the laterally protruding dog means 18 has been dispensed with making a cleaner end structure that is more symmetrical with respect to the saw blade. In effect the combination of the plate 60, the resilient member 31' and the rearward protruding portion of the plate 61 as at 65 (see FIG. 8) provides a dog means in the same manner that the which embrace the web 25 in the same manner that the dog means 18 acted. It will of course be apparent that in some situations it is not necessary to have a slight rearward projection as at 65 to the plate 61 since the gripping force of the resilient member 31' is sufficient to prevent sidewise slippage of the saw blade 10 in the storage position.

It will be seen from the above description of the assembly of the saw blade from the housed to the working position that two of the three parts are always attached one to the other as the assembly proceeds which is a great advantage in not having three different parts to handle with only two hands. In addition the brace bar is a rigid member that is engaged by the saw blade in a balanced attachment, to provide a rigid hand saw with a taut blade that is very efficient in cutting material.

I claim:

1. In a collapsible saw, a brace bar having a longitudinal recess bordered by opposite flanges, a saw blade having a width less than the distance between said flanges located in said recess, an abutment on one end of the blade in frictional engagement with one end of the bar, said blade having at the other end a brace bar-engaging member to engage the other end of the brace bar, resilient means acting between the end of the brace bar and said member and carried by one of them so as to hold the saw blade under tension in the recess of said brace bar.

2. In a collapsible saw as in claim 1 wherein the thickness of the blade is less than the extent of said opposite flanges.

3. In a collapsible saw as in claim 1 wherein said bar is substantially I-shaped in cross section.

4. In a collapsible saw as in claim 1 wherein said bar has said resilient means to hold said blade in said recess under tension.

5. In a collapsible saw as in claim 1 wherein said bar-engaging member has said resilient means to hold the blade under tension.

6. In a collapsible saw as in claim 1 wherein said bar has said resilient means to hold said blade in said recess under tension, said means being a slot in said bar to provide a finger attached at one end to said bar and free at its other end.

7. In a collapsible saw as in claim 1 wherein said resilient means is in the form of a compressible member affixed to the bar-engaging member.

8. In a collapsible saw as in claim 1 including a tubular handle having an opening through the tube of a cross section to receive the brace bar and saw blade therein.

9. In a collapsible saw as in claim 1 including a tubular handle having an opening through the tube of a cross section to receive the brace bar and saw blade therein, said tube having an abutment to limit the insertion of said bar and said blade having a stud to extend beyond said tube when the abutment is engaged and a nut threaded on said stud and engaging the end of the tubular handle to draw the bar against said tube abutment.

10. A collapsible saw comprising a saw blade member having a bar-engaging member at one end and stud means pivotally secured to the other end, a brace bar, said brace bar having a longitudinal recesss therein for receiving said blade, said bar-engaging member engaging one end of the brace bar when the saw blade is in said recess, said stud having means thereon for engaging the other end of the brace bar when the saw blade is in said recess for holding the saw blade in collapsed position in said recess, said tubular handle having an internal shape and size to receive said brace bar and saw blade when in said recess to house the same in collapsed position, a handle having an opening adjacent one end for receiving said other end of the brace bar, said bar-engaging member having hook means engaging said one end of the brace bar, an aperture through the other end portion of said handle for receiving said stud means for positioning the saw blade in working position and said stud means drawing the same through the aperture and tightening said blade between the brace bar and handle in working position.

11. A collapsible saw as in claim 10 wherein said brace bar is of I cross section with a web and at least one flange and wherein the bar-engaging member has a central slot therein to straddle the web and grip the flange of the brace bar.

12. A collapsible saw as in claim 10 wherein said brace bar is of I cross section with a web and at least one flange and wherein said one end of the bar has resilient means, said bar-engaging member having a tab adapted to engage the resilient means, whereby when the blade is nested in the recess against the web and the stud means engages the other end the resilient means holds the blade in position.

13. A collapsible saw as in claim 10 wherein said brace bar has stop means thereon spaced from said one end thereof for engaging the handle adjacent said opening limiting the insertion of the bar in said opening.

14. A collapsible saw as in claim 10 wherein the bar-engaging member includes a resilient means for engaging said one end of the brace bar.

* * * * *